Nov. 5, 1968   M. H. SAAD ET AL   3,408,740
APPARATUS FOR MEASURING FOOT LENGTH AND WIDTH
Filed Feb. 7, 1966   10 Sheets-Sheet 1
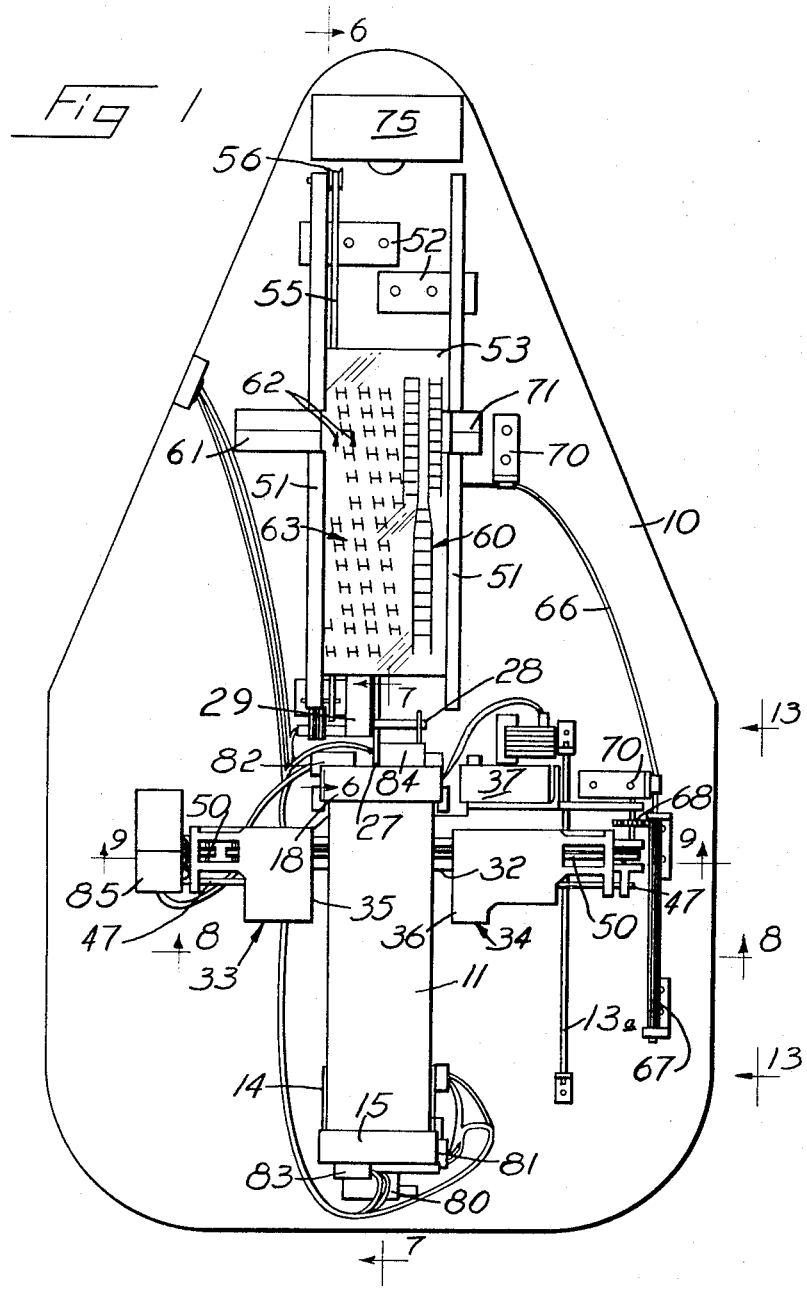
INVENTOR
MICHEL H. SAAD
MacDONALD ROGERS
BY
ATTYS.

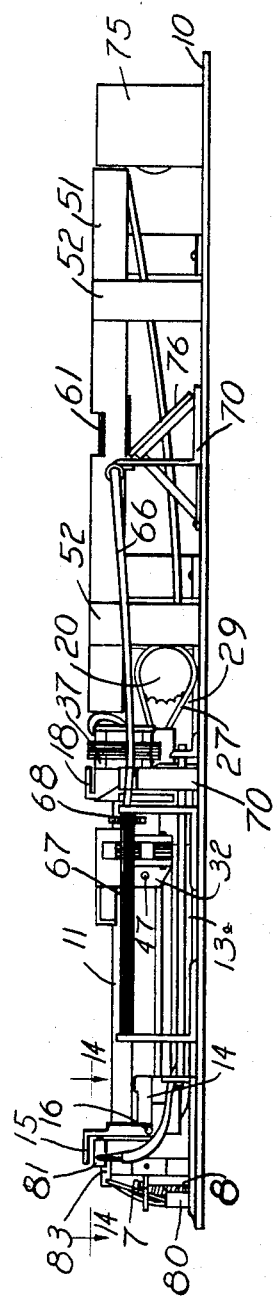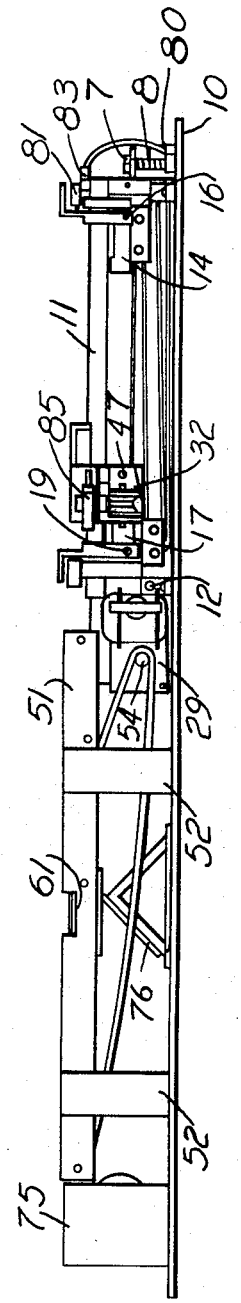

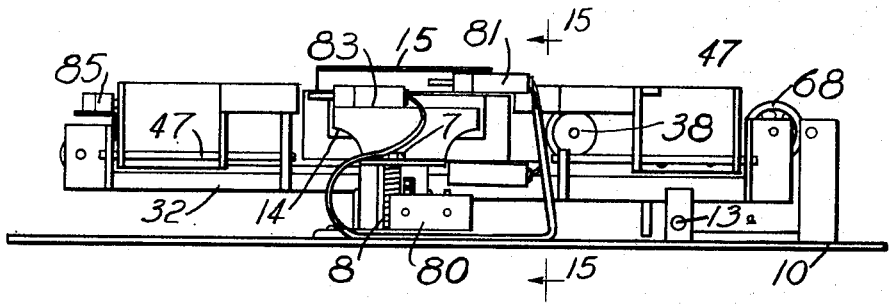
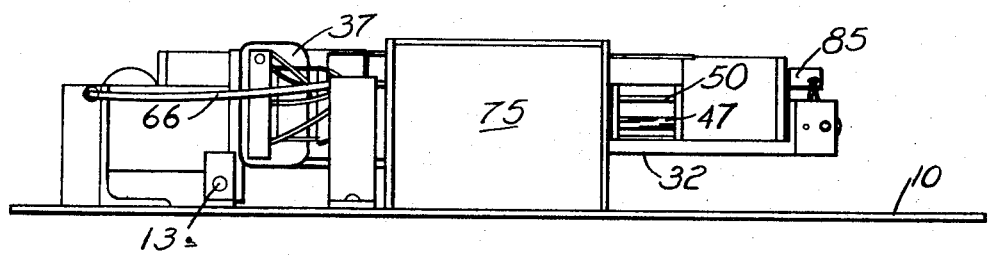

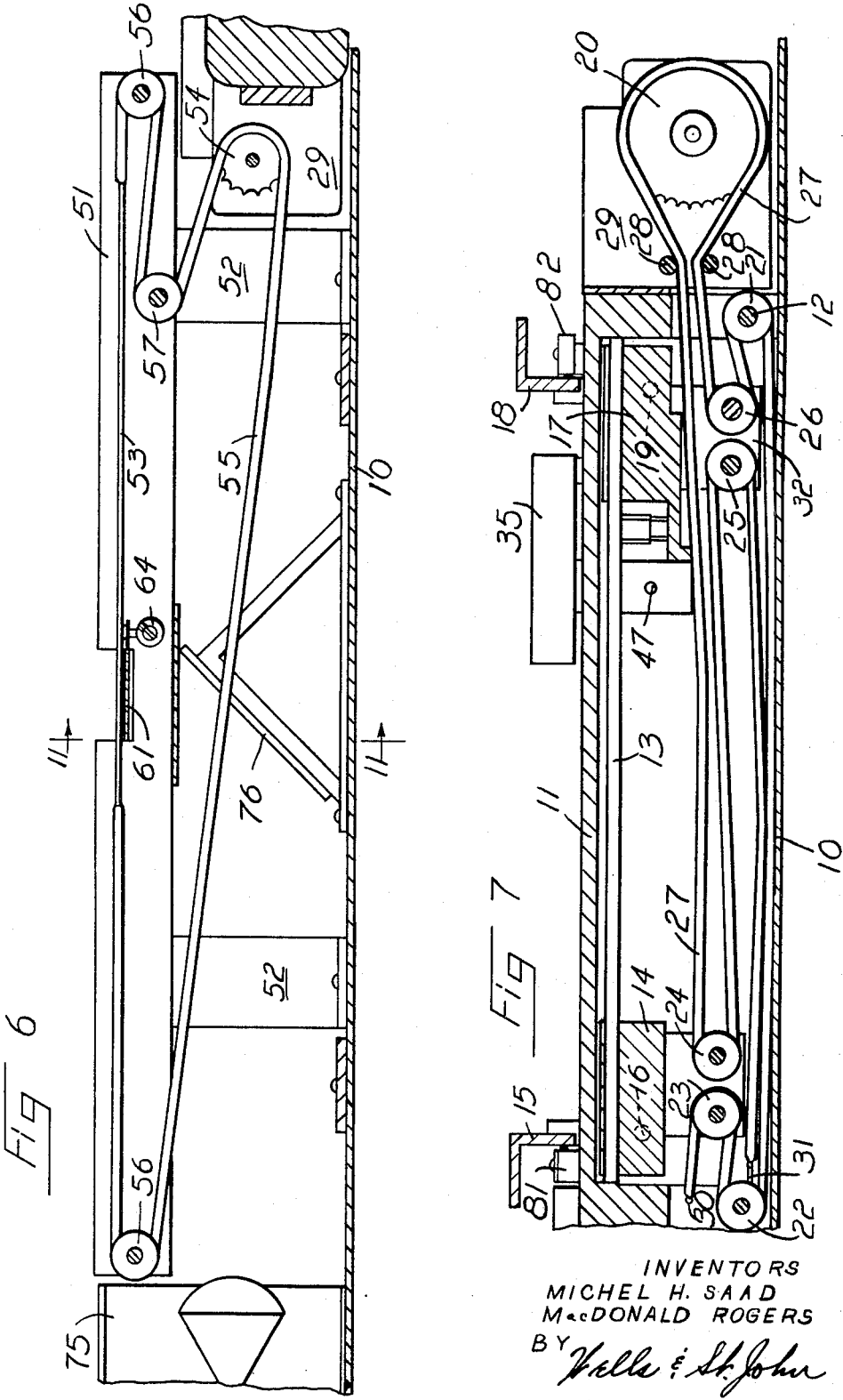

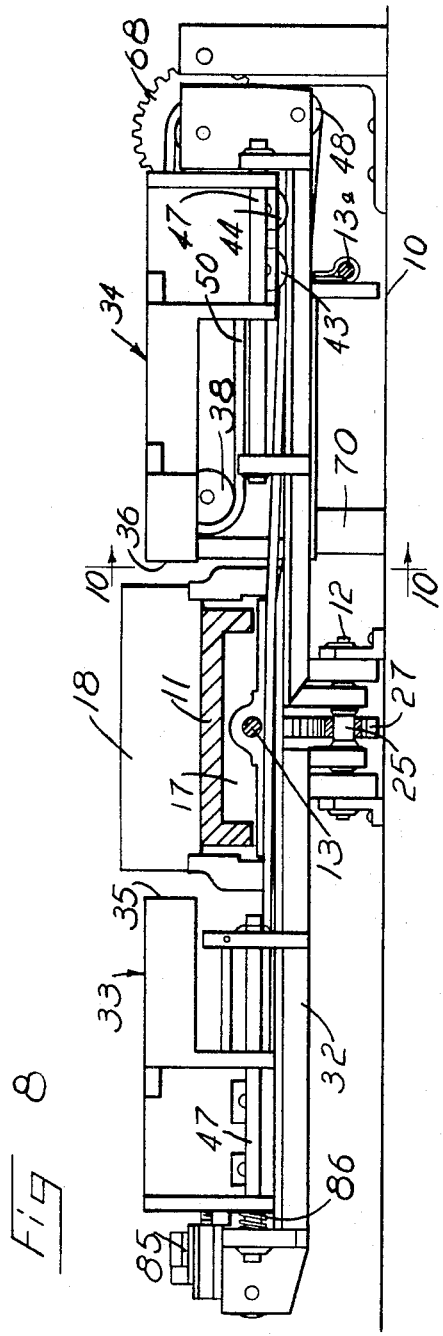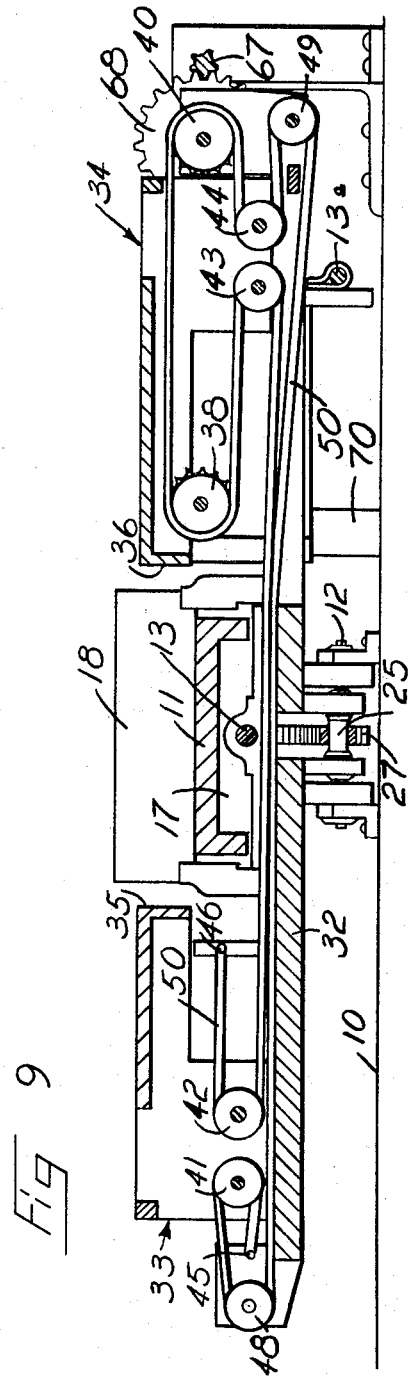

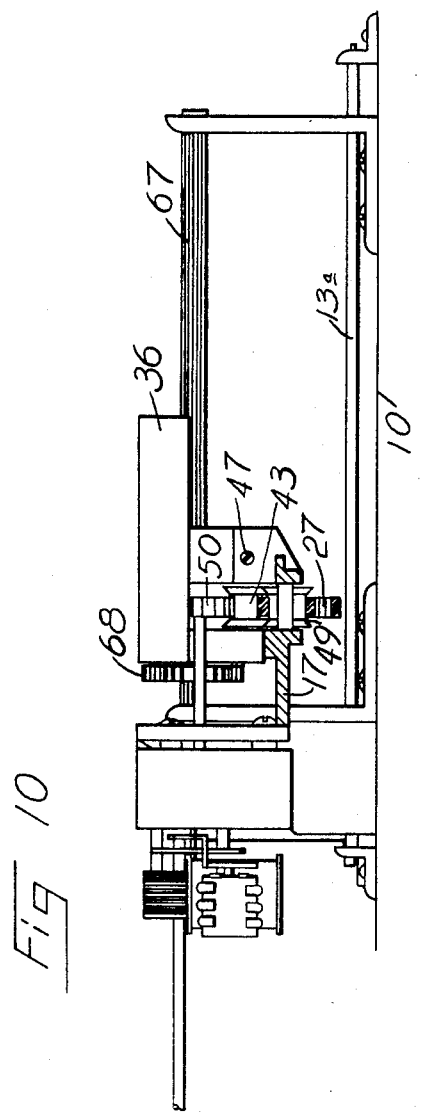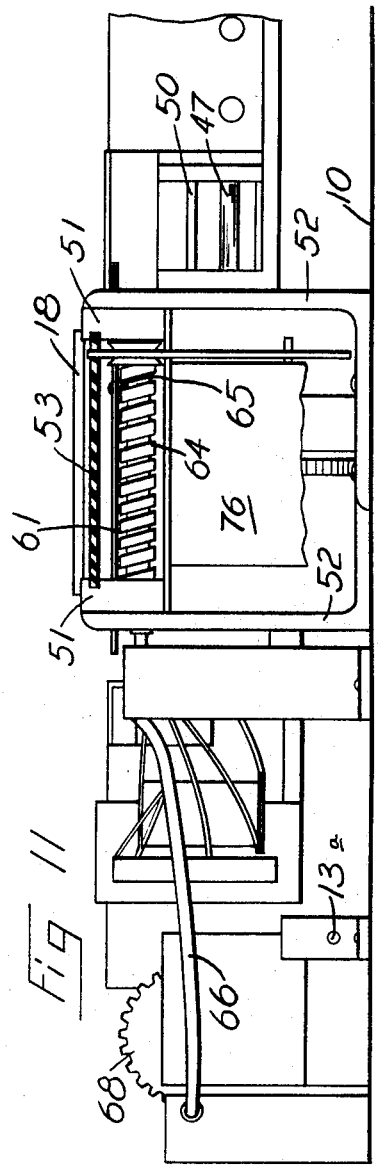

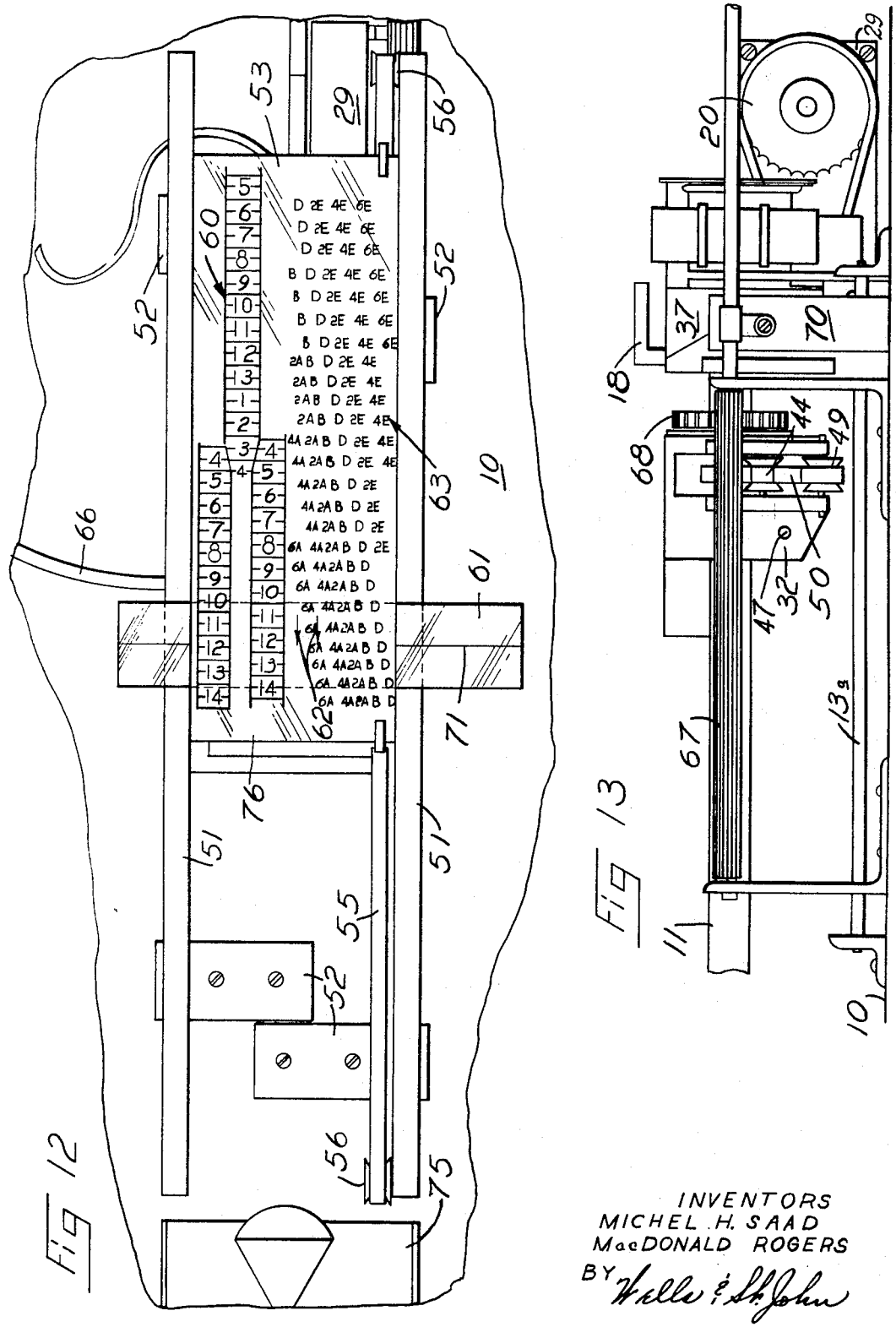

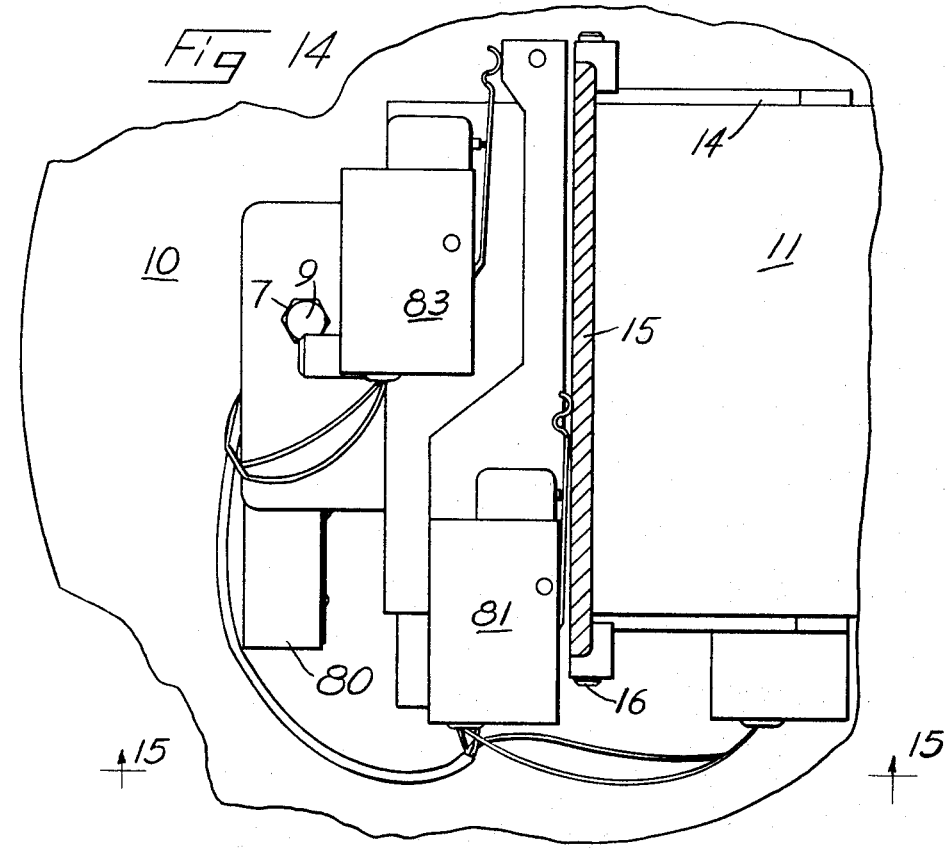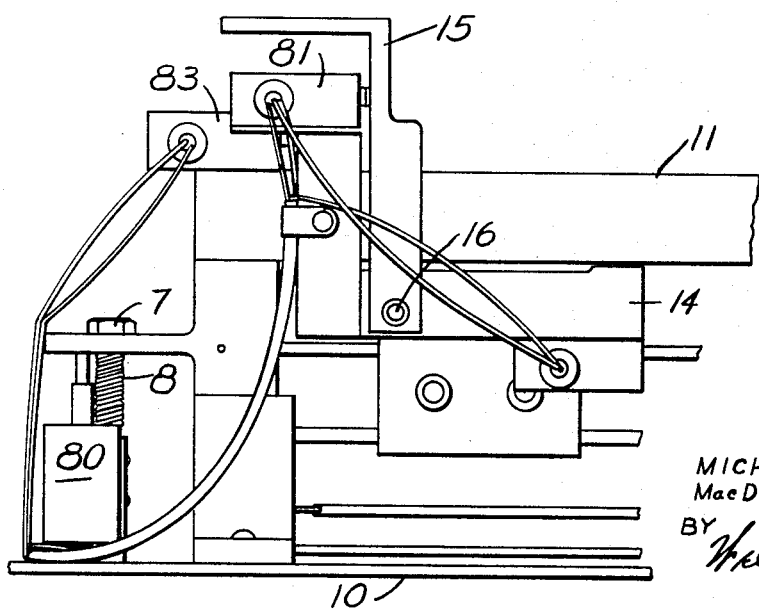

Nov. 5, 1968  M. H. SAAD ET AL  3,408,740
APPARATUS FOR MEASURING FOOT LENGTH AND WIDTH
Filed Feb. 7, 1966  10 Sheets-Sheet 9
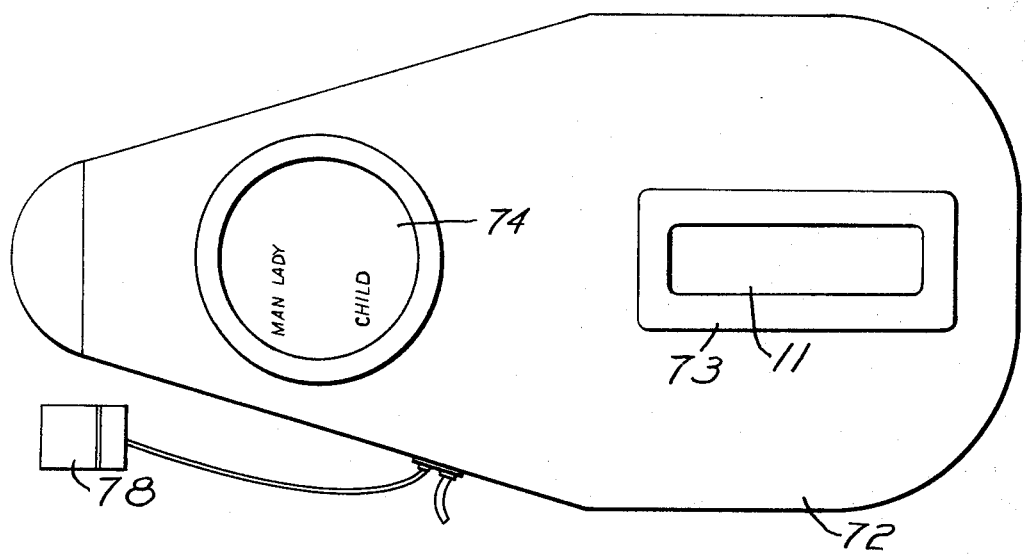
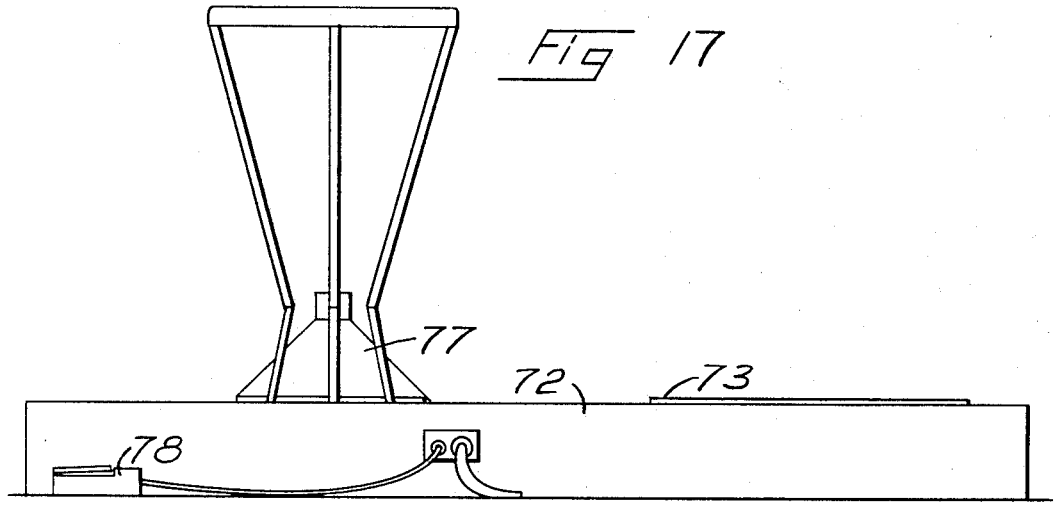
INVENTORS
MICHEL H. SAAD
MacDONALD ROGERS
ATTYS.

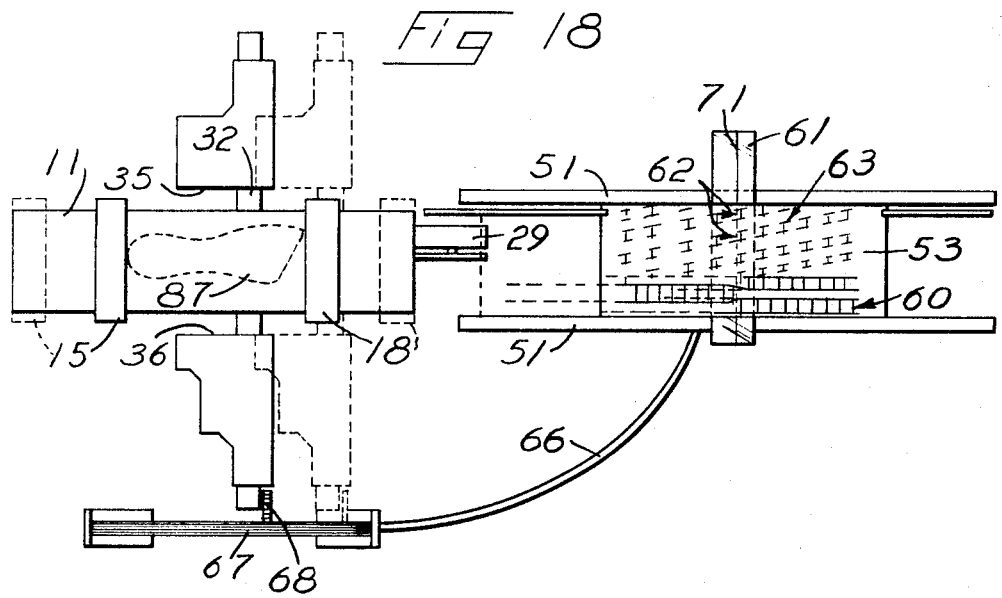
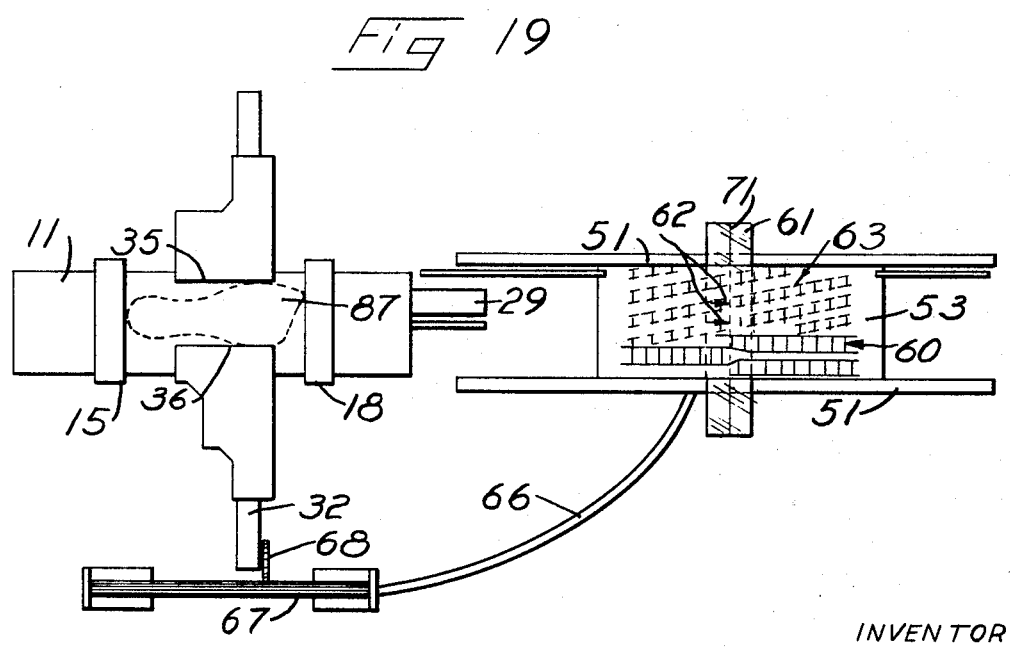

United States Patent Office 3,408,740
Patented Nov. 5, 1968

3,408,740
APPARATUS FOR MEASURING FOOT LENGTH AND WIDTH
Michel H. Saad, 1226 E. 28th Ave., Spokane, Wash. 99203, and MacDonald Rogers, Veradale, Wash.; said Rogers assignor to said Saad
Filed Feb. 7, 1966, Ser. No. 525,478
10 Claims. (Cl. 33—3)

ABSTRACT OF THE DISCLOSURE

An apparatus for mechanically registering the length and width of a foot. Two length registering abutments are mounted on a foot support, the abutments being differentially connected to permit random foot placement during measurement. A width registering apparatus including two foot contacting abutments is movably mounted along with one of the length registering abutments. Foot length and width is indicated by movable slides, preferably of transparent material so as to permit visual projection of the registered length and width on a suitable screen.

---

This invention relates to an apparatus for mechanically registering the length and width of a human foot. The measured dimension is presented visually in the form of indicated shoe sizes.

In U.S. Patent No. 3,173,208, granted March 16, 1965, to Homer J. Dana, there is described a mechanical apparatus for registering foot length and for indicating such lengths on a visible scale in terms of shoe size lengths. The device disclosed in that patent measures a human foot placed upon a foot support, regardless of the longitudinal position of the foot on the support. The present invention, using a similar dimension registering mechanism, adds an indication of foot width, both foot dimensions being related to proper shoe size. The width measurement is accomplished by a mechanical apparatus capable of properly registering the width of a foot regardless of its placement on the single foot support. In addition, an indicator apparatus is provided to indicate shoe size that is particularly adapted to projection on a wall or a direct translucent screen.

It is a first object of this invention to combine an apparatus for random length measurement of a human foot together with an apparatus for random width measurement of the same foot.

Another object of this invention is to provide a shoe size indicator that eliminates any problem of curvature or parallax. The indicator uses two adjacent slide members which move in parallel planes so that no inaccuracy in reading the indicated shoe sizes can be traced to curvature or angular projection.

Another object of this invention is to provide such an arrangement which is mechanically simple and which can be fully encased in a protective housing so as to be almost invulnerable to accidental or intentional damage.

These and further objects will be evident from the following disclosure, taken together with the accompanying drawings which illustrate a preferred form of the invention. However, it must be understood that this form of the invention is only presented by way of example, and that other alternate forms might be utilized within the scope of the claims attached hereto.

FIGURE 1 is a top view of a foot measuring apparatus with the outer cover removed;

FIGURE 2 is a side view from the right hand side of FIGURE 1;

FIGURE 3 is a side view taken from the left hand side of FIGURE 1;

FIGURE 4 is an enlarged end view taken from the bottom of FIGURE 1;

FIGURE 5 is an enlarged end view taken from the top of FIGURE 1;

FIGURE 6 is an enlarged longitudinal sectional view taken along line 6—6 in FIGURE 1;

FIGURE 7 is an enlarged sectional view taken along line 7—7 in FIGURE 1;

FIGURE 8 is an enlarged sectional view taken along line 8—8 in FIGURE 1;

FIGURE 9 is an enlarged sectional view taken along line 9—9 in FIGURE 1;

FIGURE 10 is a fragmentary view taken along line 10—10 in FIGURE 8;

FIGURE 11 is a fragmentary sectional view taken along line 11—11 in FIGURE 6;

FIGURE 12 is an enlarged fragmentary top view of the slide indicator apparatus;

FIGURE 13 is an enlarged fragmentary side elevation view taken substantially along line 13—13 in FIGURE 1;

FIGURE 14 is an enlarged fragmentary view taken along line 14—14 in FIGURE 2;

FIGURE 15 is a fragmentary side view as seen along line 15—15 in FIGURE 14;

FIGURE 16 is a top view of the apparatus with a protective cover and screen assembly in place; and FIGURE 17 is a side elevation view of the apparatus as shown in FIGURE 16;

FIGURE 18 is a schematic top view showing the initial operation of the machine to measure length;

FIGURE 19 is a subsequent schematic view showing the measurement of both length and width.

The general structure of the foot measuring apparatus is shown in FIGURES 1 through 5. These figures illustrate the apparatus with the outer protective housing removed, the external configuration of the device when complete being illustrated in FIGURES 16 and 17. FIGURES 1 through 5 and all other figures derived therefrom, do not show the protective cover or housing, which simply encases the basic mechanism illustrated.

Referring now to the drawings, the apparatus is mounted on a fixed base 10, which supports the various fixed elements. These together provide a fixed supporting framework for the assembly. Base 10 is adapted to rest upon a floor or other supporting surface. Mounted on base 10 is a foot support 11 having an upwardly facing horizontal surface upon which a foot is placed for purpose of measurement.

The foot support 11 is pivotally mounted on base 10 by means of a transverse pin 12 (FIGURE 7). The opposite end of foot support 11 is tied to base 10 by an upstanding vertical rod 9 surrounded by a compression spring 8. Upward movement of foot support 11 is limited by a cap 7 at the top of rod 9 (FIGURES 2 and 3). Rod 9 permits only slight movement of foot support 11 about pin 12 between contact with base 10 and cap 7.

Length registering apparatus

The apparatus for registering the length of a person's foot is quite similar to that shown in U.S. Patent 3,173,-208. This includes a heel abutment carriage 14 and a toe abutment carriage 17 mounted for independent translational movement relative to each other and to the foot support 11. The respective carriages 14 and 17 are slidably supported on foot support 11 by a longitudinal rod 13 fixed directly beneath the foot support 11 and movable therewith (FIGURE 7). The heel abutment carriage 14 includes a transverse plate 15 directly above the upper surface of foot support 11. Plate 15 is pivotally mounted for slight pivotal movement about the axis of a transverse pin 16 at each side of carriage 14. The toe abutment carriage also has a transverse plate 18 extending across the top of foot support 11 and facing toward the plate 15. Plate 18 is pivotally carried by pins 19 at each side of the toe abutment carriage 17.

The heel and toe abutment carriages 14, 17 are adapted to be moved inwardly relative to one another to about the heel and toe surfaces of a foot being measured. As is described in detail in the above mentioned patent, this movement is accomplished in a random manner so that the two plates 15, 18 can properly contact a foot regardless of its placement on the upper surface of foot support 11. This is accomplished by means of the mechanism illustrated in FIGURE 7, using a chain and a differential pulley system. Either or both plates 15, 18 can move inwardly the necessary amount to achieve proper contact with an even amount of pressure.

Movement of carriages 14, 17 is accomplished by means of a reversible motor 29 fixed to base 10 adjacent the end of foot support 11 on which the toe abutment carriage 17 is located. The motor 29 is provided with a driving sprocket 20 about which is entrained a chain 27. The chain 27 is positively driven by the intermeshing contact thereof on sprocket 20. At the respective ends of foot support 11 are rotatably mounted two end pulleys 21, 22. There are also two rotatable pulleys 23, 24 on the heel abutment carriage 14 and two similar pulleys 25, 26 on the toe abutment carriage 17.

Tracing the chain 27 from one of its ends to the other, it is first anchored at 30 to the heel end of the foot support 11 and is entrained over the first pulley 23 on the heel abutment carriage 14. It then wraps back about the pulley 22 at the heel end of foot support 11 and extends under and over the pulley 21 at the toe end of foot support 11. It wraps under pulley 26 of the toe abutment carriage 17 and then over a first guide pin 28 on the housing of motor 29, about the sprocket 20 and under another pin 28. The chain 27 continues rearwardly over the second pulley 24 on carriage 14, then over the second pulley 25 on carriage 17, and finally back to the heel end of foot support 11, where it is anchored at 31.

Since the two ends of chain 27 cannot move, the carriages 17, 14 must move when motor 29 is operated, whether alone or together. Generally, one carriage will move in preference to the other, depending upn the frictional forces involved with relation to their individual mountings. However, if one carriage is prevented from moving by contact with a foot being measured, the movement imparted to chain 27 will cause the remaining carriage to move until it also is physically blocked. This will be the case whether the plates 15, 18 are being moved inwardly to contact a person's foot, or are being moved outwardly after the registration of foot length has been completed.

*Width registering apparatus*

The apparatus which registers the width of a foot is carried on the toe abutment carriage 17. It is best understood by reference to FIGURES 1, 8 and 9. This apparatus is carried on a movable transverse frame 32 fixed to carriage 17 and partially supported by a second longitudinal rod 13a on base 10. Frame 32 protrudes outwardly at both sides of foot support 11. Its path of movement along with toe abutment carriage 17 is unobstructed by any fixed members on base 10.

Movably carried on frame 32 for transverse translational movement are two carriages which shall be designated as a left hand carriage 33 and a right hand carriage 34 as viewed in FIGURES 8 and 9. The two carriages 33, 34 are identical to one another, each being movably guided by a transverse rod 47 located at the respective sides of frame 32. The bottom surfaces of each carriage 33, 34 slidably rests on the upper surface of frame 32 to provide stabilization so that the carriages 33, 34 remain in proper horizontal positions. The carriages 33, 34 have inwardly facing contact surfaces 35, 36 respectively, located at an elevation slightly above the upper surface of foot support 11. The lower portions of carriages 33, 34 are recessed so that the surfaces 35, 36 can pass inwardly toward one another over foot support 11 as is necessary in order to contact a foot positioned thereon.

The mechanical apparatus for moving carriages 33, 34 is similar to that described with respect to the movement of the carriages 14, 17. Frame 32 carries a motor 37 that drives an inwardly positioned drive sprocket 38 mounted on frame 32 under the right hand carriage 34. Two differential pulleys 43, 44 are rotatably journalled on the right hand carriage 34. Likewise, carriage 33 is provided with two differential pulleys 41, 42. Outer pulleys 48, 49 are rotatably journalled on the respective outer ends of frame 32. An outside idle sprocket 40 is carried on frame 32 and located beyond sprocket 38.

A chain 50 is entrained about the various sprockets and pulleys in the following order (FIGURE 9). Beginning at an inner anchor 46 on frame 32, which is located directly beneath the left hand carriage 33, chain 50 is wrapped about pulley 42 on carriage 33. It extends across the frame 32 and about pulley 43, then over the driving sprocket 38 on frame 32. It is then wrapped about the idle sprocket 40, the remaining pulley 44 on carriage 34 and the outer pulley 49 at the right hand end of frame 32. It again returns to the left hand end of frame 32, wrapping about the pulley 48, and over the remaining pulley 41 on carriage 33. Its remaining end is fixed to an outer anchor 45 at the left hand end of frame 32.

Again, rotation of driving sprocket 38 by operation of motor 37 will cause the carriages 33, 34 to move transversely relative to frame 32 and therefore also relative to foot support 11. Movement will be imparted to either or both carriages 33, 34 until such movement is physically blocked. The free differential movement provides complete freedom of movement between the two carriages so that both can be brought into contact with the sides of a foot resting upon foot support 11 regardless of the transverse position of the foot relative to a longitudinal center line along foot support 11.

*Shoe length indicator*

The foot length registering apparatus and foot width registering apparatus each individually control portions of a shoe length and width indicating apparatus illustrated in detail in FIGURES 6 and 9 through 13. The length indicator can be best understood from FIGURES 6, 11 and 12. The indicator structure is mounted on two laterally spaced longitudinal slide supports 51. Supports 51 are fixed above base 10 by means of upright brackets 52. Between the supports 51 is slidably carried a longitudinal slide 53 preferably made of transparent material, such as sheet plastic. The side edges of slide 53 are received within longitudinal grooves extending along the inwardly facing surfaces of the respective slide supports 51 (FIGURE 11).

Slide 53 is provided with length indicating scales printed thereon in the manner shown at 60 in FIGURE 12. Three scales are illustrated, the center scale being indicative of child shoe sizes and the two laterally spaced scales being for men and ladies shoe sizes. If the machine were designed for use only in measuring the feet of children, men or women, only the necessary scale might be used. The choice of an appropriate scale will naturally depend upon the application of the machine in sales use.

The longitudinal position of slide 53 relative to the supports 51 and base 10 is used as an indicator of the shoe length necessary to fit a foot whose length has been registered by the length registering apparatus on foot support 11. The relationship between the relative positions of the heel abutment carriage 14 and toe abutment carriage 17 is achieved through a direct connection to the shaft on which is mounted the driving sprocket 20 for the chain 27. As seen in FIGURE 6, a sprocket 54 is fixed to this shaft so as to turn in unison with the previously described driving sprocket 20. Sprocket 54 has entrained about it a chain 55, which is driven in a timed relationship relative to sprocket 54. Chain 55 has its respective ends fixed to the longitudinal ends of slide 53 and is guided by two end pulleys 56 at the respective ends of slide supports 51 and by an intermeidate idle pulley 57. Thus it is evident that the longitudinal position of slide 53 will be directly proportional to the separation between the carriages 14 and 17, since its longitudinal position will relate directly to the rotation of sprockets 20 and 54. The rotational movement of sprocket 20 necessary to move carriages 14 and 17 a given distance relative toward one another will be directly transmitted through chain 55 to slide 53.

*Foot width indicator*

Besides an indication of length, it is desirable to also indicate the proper shoe width to fit a foot whose width has been registered between the contact surfaces 35, 36 of the width registering carriages 33, 34. This is accomplished by the apparatus best understood from FIGURES 9 through 13. A movable slide 61 is guided within transverse recesses in the slide supports 51, the position of slide 61 being immediately below the previously described longitudinal slide 53. Slide 61 is also made of transparent material such as a plastic sheet. Slide 61 has two indicating arrows 62 printed thereon, one arrow being used for indicating show widths for women and the other being used to indicate show widths for men and children. These are scaled in proportion to width indications 63 printed on the slide 53 transversely adjacent to the length scales 60. Since the indicated shoe width of a given shoe size varies with the length, the shoe width scales are provided for each length size. Drawing limitations made it impossible to show all the necessary shoe widths in FIGURE 12.

The transverse position of slide 61, and the printed arrows 62 thereon, are mechanically related to the transverse separation between the contact surfaces 35, 36 on foot width registering carriages 33, 34. This is accomplished by a transverse screw rotatably journalled between the slide brackets 51 beneath the slide 53 (FIGURES 6, 11). Screw 64 is engaged by a downwardly protruding follower 65 fixed to the transverse slide 61, so that rotation of screw 64 will reciprocate slide 61 in a transverse direction. Screw 64 is turned about its transverse axis through a cable 66 fixed at its remaining end to an elongated gear 67 (FIGURE 13) mounted on base 10 by two upright standards 70. Gear 67 is located adjacent to the right hand end of frame 32 for the width registering apparatus (FIGURE 9). It is engaged by a complementary pinion 68 fixed to the shaft that carries idle sprocket 40 for the width registering apparatus. Therefore, the amount of rotational movement imparted to sprocket 40 will be transmitted, in a fixed ratio, through cable 66 and screw 64 to the transversely movable slide 61.

The proper shoe length is indicated on slide 53 by a transverse line 71 on the transverse slide 61. This length indication is related to the width indicated by arrows 62, so that the proper shoe length and width are each accurately and visually presented by the combination of slides 53, 61.

*Projector apparatus*

As seen in FIGURES 16 and 17, the completed structure is housed within a protective upper cover 72 which has the general topographic configuration of base 10. A suitable molding 73 is provided directly above the foot support 11. It guides the entry of a foot through cover 72 for proper placement on foot support 11.

As an example of a suitable projection apparatus, there is generally shown a translucent projection screen 74 with fixed indications to identify the three shoe length scales for use by a man, lady or child. In use, the width arrows 62 should be two different colors, such as black and red, and a brief explanatory description of these arrows is required on or near screen 74, in order that the customer may know which arrow should be used to indicate the proper shoe width.

To project the required indication from slides 53 and 61 onto screen 74, there is provided a lamp apparatus 75 on base 10. This is a suitable projection lamp with a lens to direct light from the lamp toward the area beneath slides 53, 61. A mirror is mounted on base 10 beneath the two slides 53, 61. Mirror 76 is set at an angle of 45 degrees relative to the vertical, so as to direct light from lamp 75 in a vertical direction to the two slides 53, 61. A suitable projection lens assembly 77 on the top of cover 72 is used to focus the indicated measurements on the screen 74 for direct reading. If desired, the screen 74 can be replaced by a suitably angled mirror for directing the indications to a screen or wall surface. The necessary reversal of the indicated material for proper projection is accomplished by design of the lens assembly 77.

*Operating controls*

Both of the previously described control motors 29, 37 are reversible, being of a type with built-in reversing contacts so that the motors will automatically reverse when conditioned by the control switches to the power supply. The controls for motors 29, 37 are best understood from a study of FIGURES 1, 7, 8, 14 and 15.

First, the beginning of a measurement cycle is initiated by placement of a foot on support 11 and by operation of a foot operated switch 78 (FIGURE 17). The placement of one's foot on foot support 11 pivots the support 11 about pin 12 and operates a switch 80 on base 10 (FIGURE 15). The two switches 78, 80 are in series with the forward controls for motor 29, and initiate inward movement of the heel and toe abutment plates 15, 18 relative to one another and to the foot support 11. This movement continues until physically prevented by contact with the foot whose length is to be registered thereby.

The two carriages 14, 17 are provided with limit switches 81, 82 respectively, located just outwardly of the abutment plates 15, 18 respectively. The switches 81, 82 are operated by the slight backward pressure exerted by plates 15, 18 as they each contact a foot and pivot slightly about their respective pivots 16, 19.

Switches 81 and 82 are wired in series with the forward controls for motor 37. When both are operated, they begin inward movement of carriages 33, 34 toward one another in the manner previously described. This inward movement continues until the two sides of a foot have been properly contacted. The longitudinal relationship between the toe abutment carriage 17 and the width registering carriages 33, 34 is constant due to the integral relationship between frame 32 and the toe abutment carriage 17. The contact surfaces 35, 36 extend along a sufficient length of the space inwardly adjacent to the toe abutment carriage 17 so as to insure proper contact by surfaces 35, 36 with the widest portion of a person's foot. When the sides of the foot have been contacted by both surfaces 35, 36 motor 37 will stall.

When either the foot pedal operated switch 78 or the switch 80 has been released, the motors 29 and 37 will be reversed simultaneously. The switches 78 and 80 are wired in series with the reversing relays for motors 29 and 37 so as to reverse these motor circuits upon release of either switch 78 or 80. This will result in the carriages 14, 17, 33 and 34 being moved outwardly to their original positions as shown in the drawings.

Mounted on the foot support 11 are two outer switches 83, 84 which are operated when the respective carriages 14, 17 are in contact therewith (FIGURES 1 and 14). The details of the mountings for switches 81, 83 are shown in FIGURE 14, it being understood that a similar relationship exists at the opposite end of foot support 11, where switches 82 and 84 are mounted. The two switches 83, 84 are wired in series with the circuitry for motor 29, and when both switches 83, 84 are contacted, the motor 29 will be shut off.

Motor 37, when reversed, is controlled by a single switch 85 at the left hand end of frame 32 (FIGURE 8). Its operating element is contacted by the outer end of the left hand carriage 33 when carriage 33 is in its outward position. Since carriages 33, 34 are free to move in a random fashion, a biasing spring 86 is provided on guide rod 47 adjacent to switch 85. Spring 86 prevents the carriage 33 from operating switch 85 until the opposite carriage 34 has been moved completely outward relative to frame 32 and come to a fixed stop in abutment with the outer support for its guide rod 47. At that time, the continued movement imparted to chain 50 by motor 37 will move carriage 33 to the left in opposition to spring 86 and operate switch 85 to shut off motor 37.

Operation

The general operation of the machine is schematically illustrated in FIGURES 18 and 19. The initial positions of the foot length and width registering apparatus and shoe length and width indicators are shown in dashed lines in FIGURE 18. The heel abutment plate 15 and toe abutment plate 17 are fully extended apart from one another. The two contact surfaces 35 and 36 for the width registering carriages 33, 34 are also fully extended outwardly on the longitudinally movable frame 32. The width indicating slide 61 is at one side of the supports 51 and the length indicating slide 53 is in its original position at one end of the supports 51.

When a foot has been placed upon foot support 11, switch 80 is operated as previously described and operation of motor 29 will begin upon operation of the foot controlled switch 78. The initial movement of motor 29 will cause either or both of the length registering plates 15, 18 to move inwardly until each contacts the foot. The apparatus is completely random in operation, and the particular placement of a foot 87 on foot support 11 does not vary the accuracy of the registered measurement. This is due to the positive connection that exists between the rotating motor 29 and the two carriages 14, 17 by means of the fixed length chain 27. If one carriage 14 is stopped by abutment with the foot 87, the remaining carriage will continue its inward movement until it also has been placed in contact with the foot.

When both abutting plates 15 and 18 are in contact with the foot, the switches 81 and 82 will be operated to stop motor 29 and initiate movement of motor 37. This will occur when the carriages 14, 17 reach the position shown in full lines in FIGURE 1. At the same time the movement imparted to the carriages 14, 17 will have been positioned the length indicating slide 61 so that the proper length on scales 60 will be indicated by line 71 on slide 61.

Operation of motor 37 will bring the carriages 33, 34, inwardly toward one another, again utilizing the principle of a differential movement so that either or both carriages are free to move. Again, the special relationship between the contacting surfaces 35, 36 of carriages 33, 34 will be related directly to the rotational movement of sprockets 38 and 40, since chain 50 is fixed at its outer ends and cannot stretch. This rotational movement will be imparted through pinion 68 and gear 67 to the cable 66 and screw 64 to move the slide 61 transversely and indicate the proper width of a shoe to fit the foot 87 at one of the arrows 62.

Upon release of the foot control switch 78, or upon removal of foot 87 from foot support 11, the motors 29 and 37 will be reversed simultaneously. The length indicating carriages 14, 17 will continue outwardly until the two switch 83 and 84 have been operated. The width indicating carriages 33, 34, will move outwardly until the switch 85 has been operated as previously described. Operation of switches 83, 84 will stop motor 29 and operation of switch 85 will stop motor 37.

The mechanical length and width registering apparatus is thus tied directly to a simple shoe width and length indicator, the indicator being capable of being read directly or being projected to a suitable screen. The use of parallel adjacent slides 53, 61 to show shoe length and width eliminates variations in reading due to the angle at which the indications are observed, as might occur if curved or spaced surfaces were utilized. The indicating apparatus is extremely simple to calibrate relative to the movement of the length and width registering carriages, this calibration being accomplished by proper choice of sprocket and gear ratios.

Having thus described our invention, we claim:

1. In an apparatus for designating proper shoe length and width to fit a human foot:
   a supporting framework;
   foot length registering means on said framework;
   foot width registering means on said framework;
   a first slide member mounted on said framework for planar translational motion relative thereto in a first direction;
   a second slide member on said framework overlapping and adjacent to said first slide member for planar translational motion relative to said framework in a second direction perpendicular to said first direction and parallel to said first slide member;
   first means operatively connected to said foot length registering means and to said first slide member to position said first slide member relative to said framework in response to the length registered by said foot length registering means;
   second means operatively connected to said foot width registering means and to said second slide member to position said second slide member relative to said framework in response to the width registered by said foot width registering means;
   one of said slide members having a shoe length scale imprinted thereon extending parallel to the direction of movement thereof relative to said framework;
   said one slide member further having a series of shoe width scales imprinted thereon extending transverse to the direction of movement thereof relative to said framework;
   the remaining slide member having means thereon to indicate the position of said first and second slide members relative to one another and to said framework by visually indicating shoe length and width on said shoe length scales and said shoe width scales on said slide member.

2. An apparatus as set out in claim 1, wherein said first and second slide members are made of light transmitting material, further comprising:
   a source of light on said framework directed through said first and second slide members;
   lens means on said framework to receive light transmitted through said first and second slide members from said source of light;
   and a screen in alignment with said lens means on which a projected image of said first and second slide members can be focused by said lens means.

3. A foot measuring apparatus comprising:
   a framework including a foot support;
   first abutment means mounted on said framework for translational motion relative to said foot support, said abutment means including first and second foot engaging abutments each having at least a portion thereof extending above said foot support for engagement with the heel and toe ends of a foot resting on said foot support;
   first differential means operatively connected to said first and second foot engaging abutments for effecting translational movement of said first and second abutments inward toward one another or outward apart from one another, said first and second abutments being movable by said first differential means either in unison or independently of one another;
   first operating means on said framework operatively connected to said first differential means for selectively operating said first differential means to effect movement of said first and second foot engaging abutments relative to one another;

a frame operatively connected to one of said first and second foot engaging abutments for translational motion therewith relative to said framework;

second abutment means mounted on said frame for translational motion relative to said frame and said framework in a direction transverse to the direction of movement of said first abutment means relative to said framework, said second abutment means including third and fourth foot engaging abutments each having at least a portion thereof extending above said foot support for contacting opposite sides of a foot resting on said foot support;

second differential means operatively connected to said third and fourth foot engaging abutments for effecting translational movement of the third and fourth foot engaging abutments inward toward one another or outward apart from one another, said third and fourth abutments being movable by said second differential means either in unison or independently of one another;

and second operating means on said framework operatively connected to said second differential means for selectively operating said second differential means to effect movement of said third and fourth foot engaging abutments relative to one another.

4. An apparatus as set out in claim 3 further comprising:

first motion limiting means on said foot support interposed in the outward path of each of said first and second abutments adapted to limit the outward movement thereof apart from one another;

and second motion limiting means on said framework interposed in the outward path of each of said third and fourth abutments adapted to limit outward movement thereof apart from one another.

5. An apparatus as set out in claim 3 further comprising:

first control means on said framework operatively connected to said first operating means to activate said first operating means to move said first and second abutments inwardly toward one another when said first control means is activated;

and second control means on said first and second abutments operatively connected to said second operating means to activate said second operating means to move said third and fourth abutments toward one another when both of said first and second abutments have made contact with a foot being measured.

6. A foot measuring apparatus as set out in claim 5, further comprising:

means operatively connected to said foot support and said framework to reverse operation of said first and second operating means upon removal of a foot from said foot support.

7. An apparatus as set out in claim 3, further comprising:

foot length indicating means operatively connected to said first differential means for visually indicating the foot length represented by the separation between said first and second abutments;

and foot width indicating means operatively connected to said second differential means and to said foot length indicating means for visually indicating the foot width represented by the separation between said third and fourth abutments, the indicated width being visually related to the foot length indicated by said foot length indicating means.

8. A foot measuring apparatus comprising:
a stationary framework;
a foot support on said framework having an upwardly facing surface on which is placed a foot to be measured;

first and second opposed abutments extending transversely across said surface and located upwardly adjacent thereto, said first and second abutments being movably mounted on said framework for longitudinal translational motion relative to said foot support for selective engagement with the heel and toe ends of a foot placed on said foot support;

first differential pulley means operatively connected to said first and second abutments for effecting translational movement of said first and second abutments inward toward one another and outward apart from one another, said first and second abutments being movable by said first differential pulley means in unison, and at least one of said first and second abutments being movable by said first differential pulley means independently of the other of said first and second abutments;

first power means on said framework positively connected to said first differential means for selectively operating said first differential pulley means to effect movement of said first and second foot engaging abutments relative to one another;

a transverse frame mounted on said framework and connected to one of said first and second abutments for motion therewith relative to said framework;

third and fourth opposed abutments extending longitudinally along said surface and located upwardly adjacent thereto, said third and fourth abutments being movably mounted on said frame for transverse translational motion relative to said foot support for selective engagement with opposite sides of a foot placed on said foot support;

second differential pulley means operatively connected to said third and fourth abutments for effecting translational movement of the respective abutments inward toward one another or outward apart from one another, said third and fourth abutments being movable by said second differential pulley means in unison, and at least one of said third and fourth abutments being movable by said second differential pulley means independently of the other of said third and fourth abutments;

second power means on said framework positively connected to said second differential pulley means for selectively operating said second differential pulley means to effect movement of said third and fourth abutments relative to one another;

motion limiting means on said framework in the respective paths of movement of said first, second, third and fourth abutments to limit outward movement of each abutment relative to said foot support and to respectively locate each abutment at an initial position;

first control means on said framework operatively connected to said first power means to activate said first power means to move the first and second abutments inwardly toward one another from their respective initial positions when said first control means is activated;

second control means on said framework operatively connected to said first and second abutments and to said second power means to activate said second power means to move said third and fourth abutments inwardly toward one another from their respective initial positions when both of said first and second abutments have made contact with the foot placed on said foot support;

and means operatively connected to said first and second power means to selectively reverse operation thereof to return said abutments to their respective initial position.

9. An apparatus as set out in claim 8 further comprising:

foot length indicating means operatively connected to said first differential pulley means for visually indicating the foot length represented by the separation between said first and second abutments;

and foot width indicating means operatively connected to said second differential pulley means and to said foot length indicating means for visually indicating the foot width represented by the separation between said third and fourth abutments, the indicated width being visually related to the foot length indicated by said foot length indicating means.

10. An apparatus as set out in claim 8 further comprising:

first indicating means movably mounted on said framework for motion relative thereto in a first direction;

second indicating means on said framework overlapping and adjacent to said first indicating means for motion relative to said framework in a second direction perpendicular to said first direction;

first means operatively connected to said first differential pulley means and to said first indicating means to position said first indicating means relative to said framework in a direct relation to the separation between said first and second abutments;

second means operatively connected to said second differential pulley means and to said second indicating means to position said second indicating means relative to said framework in direct relation to the separation between said third and fourth abutments;

one of said indicating means having a shoe length scale imprinted thereon extending along the direction of movement thereof relative to said framework;

said one indicating means further having a series of shoe width scales imprinted thereon extending transverse to the direction of movement thereof relative to said framework;

the remaining indicating means having means thereon for indicating the position of said first and second indicating means relative to one another and to said framework by virtually indicating shoe length and width on said shoe length scales and said shoe width scales on said indicating means.

References Cited

UNITED STATES PATENTS

| | | | |
|---|---|---|---|
| 1,582,636 | 4/1926 | Clarke | 33—3.6 |
| 2,251,825 | 8/1941 | Fitzpatrick | 33—3.4 |
| 3,126,634 | 3/1964 | Fournier | 33—3.6 |
| 3,173,208 | 3/1965 | Dana | 33—3.2 |
| 3,192,627 | 7/1965 | Levitt et al. | 33—3.6 |
| 3,277,779 | 10/1966 | Doran | 33—3.4 XR |

LEONARD FORMAN, *Primary Examiner.*

LLOYD V. ANDERSON, *Assistant Examiner.*